324-366 SR
6/15/82    OR    4,335,353

United States Patent [19]

Lacour-Gayet

[11]  4,335,353

[45]  Jun. 15, 1982

[54] METHOD AND APPARATUS FOR DETECTING AN ANOMALY IN A RESISTIVITY MEASUREMENT OF AN EARTH FORMATION

[75] Inventor: Philippe J. Lacour-Gayet, Ridgefield, Conn.

[73] Assignee: Schlumberger Technology Corporation, New York, N.Y.

[21] Appl. No.: 49,382

[22] Filed: Jun. 18, 1979

[51] Int. Cl.$^3$ .............................................. G01V 3/24
[52] U.S. Cl. ................................... 324/366; 324/373; 324/375
[58] Field of Search ................ 324/366, 371, 373–375

[56] References Cited

U.S. PATENT DOCUMENTS

| | | | |
|---|---|---|---|
| 2,880,389 | 3/1959 | Ferre et al. | 324/373 X |
| 2,884,590 | 4/1959 | Welz | 324/373 |
| 2,933,674 | 4/1960 | Schuster | 324/373 |
| 3,068,401 | 12/1962 | Janssen | 324/373 |
| 3,462,679 | 8/1969 | Attali | 324/375 |
| 3,706,025 | 12/1972 | Regat . | |
| 3,772,589 | 11/1973 | Scholberg | 324/373 |

OTHER PUBLICATIONS

Woodhouse, R. "The Laterolog Groningen Phantom Can Cost You Money", SPWLA Nineteenth Annual Logging Symp. Jun. 13–16, 1978, pp. 1–17.

*Primary Examiner*—Gerard R. Strecker
*Attorney, Agent, or Firm*—Kenneth Olsen; Louis H. Reens

[57]  ABSTRACT

A method and apparatus are described for detecting the presence of an anomaly, such as the Groningen effect, whereby an error in a resistivity measurement of an earth formation layer is noted when such layer is located below a highly resistive bed. The resistivity is measured with a resistivity measuring sonde with the aid of a reference electrode located between the sonde and a conductive sheath around the cable from which the sonde is suspended in a borehole. A phase sensitive signal is measured and used to detect the presence of an error. In one embodiment, the out-of-phase potential of an electrode is recorded alongside a resistivity measurement as a function of depth. In another embodiment, the out-of-phase potential deviation from a normal value is determined and used to derive a corresponding in-phase potential deviation from which a measurement of the magnitude of the error in the resistivity measurement is made. Other embodiments are shown and described.

43 Claims, 10 Drawing Figures

METHOD AND APPARATUS FOR DETECTING AN ANOMALY IN A RESISTIVITY MEASUREMENT OF AN EARTH FORMATION

FIELD OF THE INVENTION

This invention relates to electrical well logging and more particularly to a method and apparatus for detecting and/or measuring anomalies in electrical resistivity measurements of subsurface earth formations located below a highly resistive formation bed.

BACKGROUND OF THE INVENTION

Figure 1:
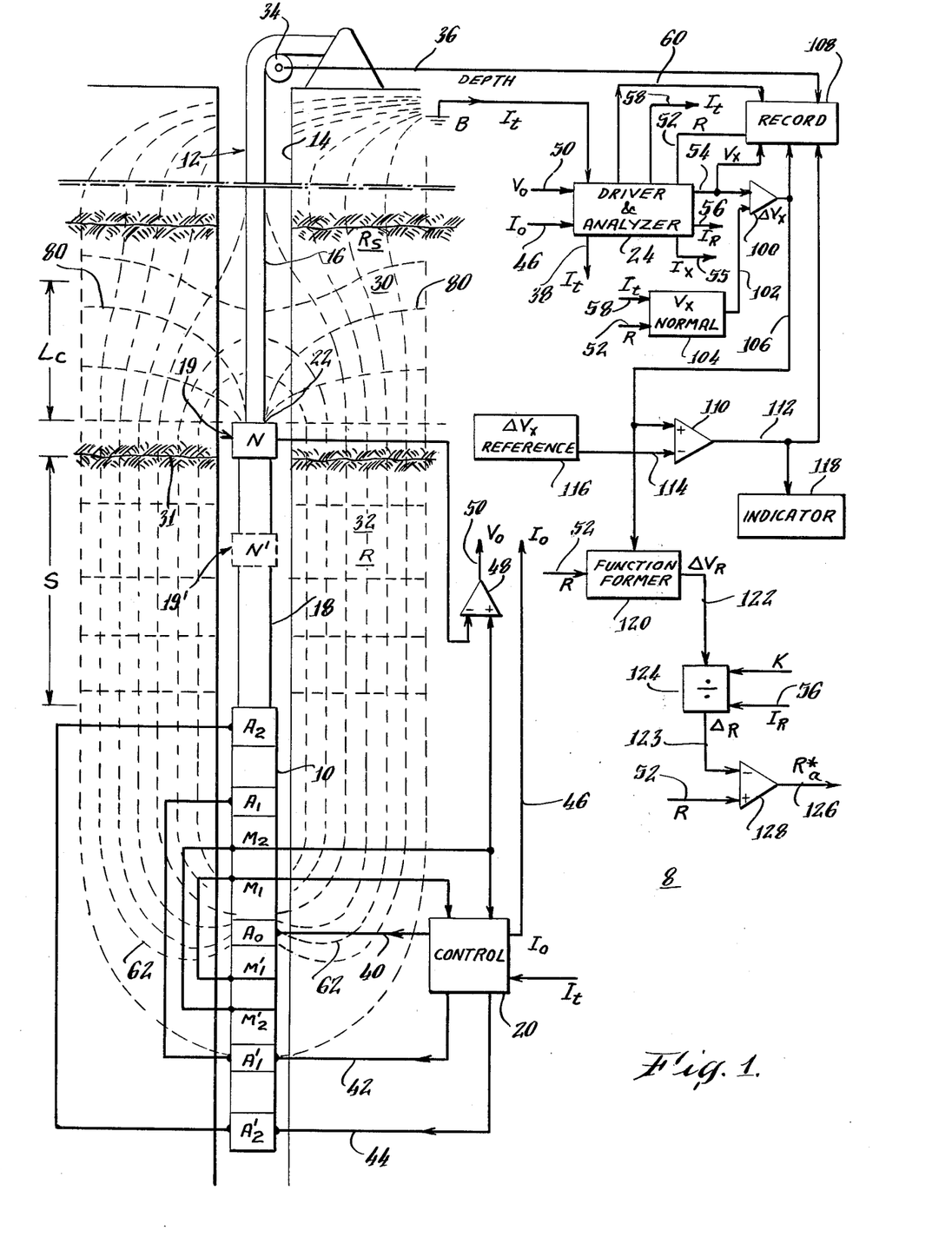
FIG. 1 is a schematic representation of a formation condition leading to an anomaly in the measurement of the resistivity with a network for implementing the technique of this invention to detect the anomaly and provide for its correction.

One known method of electrical well logging is described in the U.S. Pat. No. 3,772,589, which issued to Scholberg. As described in this patent, a resistivity investigating sonde 10 such as shown in FIG. 1 of this application is suspended from a cable 12 in a borehole 14. The cable 12 is surrounded by a conductive sheath 16 such as an externally exposed armor, which, for a distance starting at the top of the sonde, is surrounded by an insulating sleeve 18 to form what is generally known as a bridle.

The sonde 10 generates, with a down-hole control 20, two types of survey currents at different frequencies of 280 Hz and 35 Hz. The high frequency survey current is intended to enable, by using one array of electrodes, the measurement of resistivity of the nearby formation while the lower frequency survey current enables, by use of another electrode array, the measurement of the resistivity of deeper formation regions. The sonde is provided with a plurality of electrodes, the central electrode, $A_o$, of which introduces a survey current $I_o$ into the formation. Other electrodes known as guard electrodes $A_1$, $A_2$ are provided to generate bucking currents which aid to obtain a laterally deep penetration into the formation of the low frequency survey current $I_o$ before its upward redirection to a surface located return electrode (known as the B electrode). The B return electrode provides a return of both the survey and bucking currents.

The driving voltage $V_o$ for the survey current is sensed by measuring the potential between one of the sonde's voltage sensing electrodes, M, and a reference electrode N. This reference electrode N may be placed at a location 19 and near or connected to the bottom end 22 of the conductive sheath or armor 16 at the top of bridle 18 or be an isolated electrode such as N' at 19' located on the bridle 18 generally at some large distance from the upper end of sonde 10.

With the known sonde, resistivities are measured with a driver and analyzer network 24, commonly located on the surface and to which downhole sensed signals such as the sonde potential $V_o$ and survey current $I_o$ are transmitted via a telemetry cable link. A drive current such as $I_t$ is delivered by cable 12 to a downhole located control 20 to provide survey and bucking currents.

In the use of sonde 10, formation resistivities can be measured over a wide range of field conditions. Field conditions may be encountered, however, whereby, for example, the potential of the reference electrode N is influenced by an irregular return of currents to the surface electrode B and thus an error in the resulting resistivity measurement occurs. One of such field conditions has been found to occur when the current electrode B is located on the top of the bridle 18 above the reference electrode N, and when the sonde 10 is moved to a region immediately below a highly resistive bed 30 overlying a low resistive formation layer 32. In FIG. 1, this would correspond to B at 19 and N at 19'. The resulting resistivity measurement was found to be in error by a substantial factor. The solution to this problem involved a relocation of the current electrode B to the surface as shown in FIG. 1.

Notwithstanding the relocation of the current electrode B, anomalies in the measurement of resistivities with a sonde such as 10 at bed boundaries as depicted in FIG. 1 have been observed when operating with survey currents at a frequency of 35 Hz. The anomalies are normally characterized by a resistivity measurement at a value which leads one to believe a presence of hydrocarbons when in fact only salt water is found. Such misleading resistivity measurement leads to an undesirably expensive and unnecessary testing of the well.

SUMMARY OF THE INVENTION

With an electrical well-logging technique in accordance with the invention, the described anomaly in the measurement of formation resistivity can be detected and a correction formulated for the resistivity measurement. A technique in accordance with the invention is based upon the discovery that measurement of a phase sensitive signal such as the out-of-phase component of the potential between the sonde and a distant reference electrode N, as measured relative to the phase of the current can be used to identify an anomalous resistivity measurement.

Thus with one technique in accordance with the invention, the out-of-phase potential is monitored and when its amplitude exceeds a predetermined level, which is representative of what is normally encountered for this type of formation being investigated, an indication of the presence of an error in the resistivity measurement can be made.

To another technique in accordance with the invention, a measurement which is a function of the out-of-phase potential is obtained. In one form of this technique, a value for the normal out-of-phase potential is determined for a homogeneous formation of known and comparable resistivity to that of the formation being investigated. The portion of the out-of-phase potential in excess of this normal potential is determined and used to obtain a measurement of the magnitude of the abnormal in-phase potential. A correction of the resistivity measurement may then be obtained using the measured abnormal in-phase potential or an indication of the magnitude in resistivity error may be provided.

It is, therefore, an object of the invention to provide an improved method and apparatus for accurately measuring the resistivity of formation layers below highly resistive beds or measuring the error in such resistivity measurement.

In certain cases it may not be feasible to utilize a phase sensitive signal to determine the actual magnitude of the error in the resistivity measurement or its correction. For example, the measured magnitude of the abnormal out-of-phase potential may be so large that its use for the correction of the resistivity measurement would obscure the correct value. The phase sensitive signal, however, can still be used as an indicator of an anomaly such as the presence of an error in the resistivity measurement. It is thus a further object of the invention to provide a method and apparatus for indicating the presence of an error in the measurement of formation resistivity.

In an electrical well logging technique in accordance with the invention, the detection and/or correction of anomalies in the measured resistivity can be conveniently carried out. Available tools employ, within signal processing circuits, signals representative of a phase sensitive signal such as the out-of-phase potential between an electrode on the sonde and a reference electrode. This phase sensitive signal may be advantageously recorded or utilized in a particular manner in accordance with the invention to enhance the accuracy of the electrical logging of formation layers adjacent highly resistive beds.

These and other advantages and objects of the invention can be understood from the following description of several embodiments which are described in conjunction with the drawings.

DETAILED DESCRIPTION OF EMBODIMENTS

With reference to FIG. 1 and as previously described herein, a well logging tool 8 is shown which includes a depth sensor 34 to provide a signal on line 36 indicating the depth of sonde 10. The driver analyzer 24 produces a drive current, $I_t$ on line 38 at a low frequency of the order of 35 Hz. The line 38 extends down cable 12 to control 20 where the drive current is used to produce a survey current on line 40 to the survey electrode $A_o$ and bucking (focusing) currents on lines 42, 44 to pairs of guard electrodes $A_1$ and $A_1'$, and $A_2$ and $A_2'$. As described in the aforementioned patent to Scholberg, the currents supplied to pairs of guard electrodes $A_1$, $A_2$ are controlled such that the potential difference between voltage sensing pairs of electrodes $M_1$, $M_1'$ and $M_2$, and $M_2'$ is zero.

The control 20 senses the magnitude of the survey current $I_o$, and produces a signal indicative thereof on a line 46 for transmittal along cable 12 to surface located driver/analyzer 24. A voltage $V_o$ representative of the sonde potential at electrodes $M_2$, $M_2'$ for example relative to a reference electrode N is sensed and amplified by amplifier 48 for transmittal along line 50 in cable 12 to surface located driver/analyzer 24. The transmittal of sonde potential, $V_o$ and sensed survey current signal $I_o$ may be done with a telemetry link as described in the aforementioned Scholberg patent.

The driver/analyzer 24 may produce in a similar manner as described in the aforementioned Scholberg patent a signal on line 52 representative of resistivity R of the formation opposite sonde 10. Preferably, however, resistivity is measured by using a technique as described with reference to FIG. 7. Other signals generated within driver/analyzer 24 are a signal on line 54 indicative of the out-of-phase potential $V_x$ of the potential $V_o$ as measured effectively relative to the phase of the total current $I_t$ from the return electrode B. The out-of-phase portion, $I_x$ of the survey current $I_o$ is produced on line 55. On line 56 the in-phase portion $I_R$, of the survey current $I_o$ is produced. The total current value $I_t$ is generated on line 58 and the in-phase potential $V_R$ is supplied on line 60. These various in-phase and out-of-phase signals, such as $V_x$, $V_R$, $I_x$ and $I_R$ are shown as emanating as output signals from driver/analyzer 24 for purposes of this invention. In previous electrical logging, however, only the signal representative of the resistivity measurement R on line 52 is normally used and recorded.

An error in the measurement of the resistivity R of the formation is found to occur as the sonde 10 is moved upward along borehole 14. When the end 22 of the exposed conductive armor 16 is within a highly resistive bed 30 with a resistivity $R_s$, and of substantial thickness, and the sonde 10 is in a low resistivity formation layer 32, the resistivity R for the layer 32 is measured higher than it should be. This erroneously high resistivity measurement, known as the Groningen effect (named after the location in Holland where it was first identified) is inconsistent with actual conditions.

For example, in the Groningen field, a highly resistive and thick bed, such as formed of salt or anhydrite overlies a porous sandstone layer. The resistive anhydrite bed may be as thick as 800 meters with a resistivity $R_s$ greater than 10,000 $\Omega$-m. In contrast, the underlying sandstone layer would, if containing only salt water, have a resistivity R of the order of two to three tenths (0.2 to 0.3) $\Omega$-m.

When a resistivity measurement was made with a tool such as described in the Scholberg patent, the resistivity measured with the low frequency (35 Hz) survey current is of the order of one $\Omega$-m. This three or more fold increase in resistivity with other factors and measurements would indicate a possible hydrocarbon-water contact. In practice, however, the formation layer 32 produced only salt water.

It has been discovered that the Groningen effect is, surprisingly, attributable to an AC skin effect even though a survey current at a low frequency of 35 Hz is used. The skin effect creates a negative in-phase potential far above the sonde 10 since all of the returning current is trapped into a cylinder of a radius $\delta$, the skin depth. The conductive sheath or armor 16 acts as a short circuit to cause this normally distant negative potential to be brought down to the reference electrode N whose potential is thus given a negative bias.

With reference to FIG. 1, dashed current lines 62 are shown to emanate from the central electrode $A_o$, initially, primarily in a lateral direction, but then turning upward in a cylinder towards the surface located return electrode B. Similar current lines emanate from the guard electrodes $A_1$ and $A_2$ but have been deleted from the drawing for clarity. All of the current from the electrodes returns in a cylinder around the cable 12 and bridle 18 with a cylinder radius of one skin depth, $\delta$. The size of the skin depth is determined by the relationship $$\delta = \sqrt{\frac{2R}{\mu\omega}}$$

where $\omega$ is the circular frequency, $\mu$ the magnetic permeability and R the resistivity of the formation. The linear resistance of the cylinder is then the resistivity R divided by the section $\pi\delta^2$, or $$\frac{R}{\pi\delta^2} = \frac{\omega\mu}{2\pi};$$

thus the linear resistance is independent of formation resistivity.

In a non-magnetic formation the skin depth is approximately $85 \sqrt{R}$ meters at the survey frequency of 35 Hz. In the vicinity of the sonde 10 the skin depth is at least, even for a resistivity of 0.2 $\Omega$-m, about 40 meters. Hence, near sonde 10 the current lines 62 radiate, like DC, laterally. However, at far distances from the sonde 10, AC effects become dominant.

Figure 2:
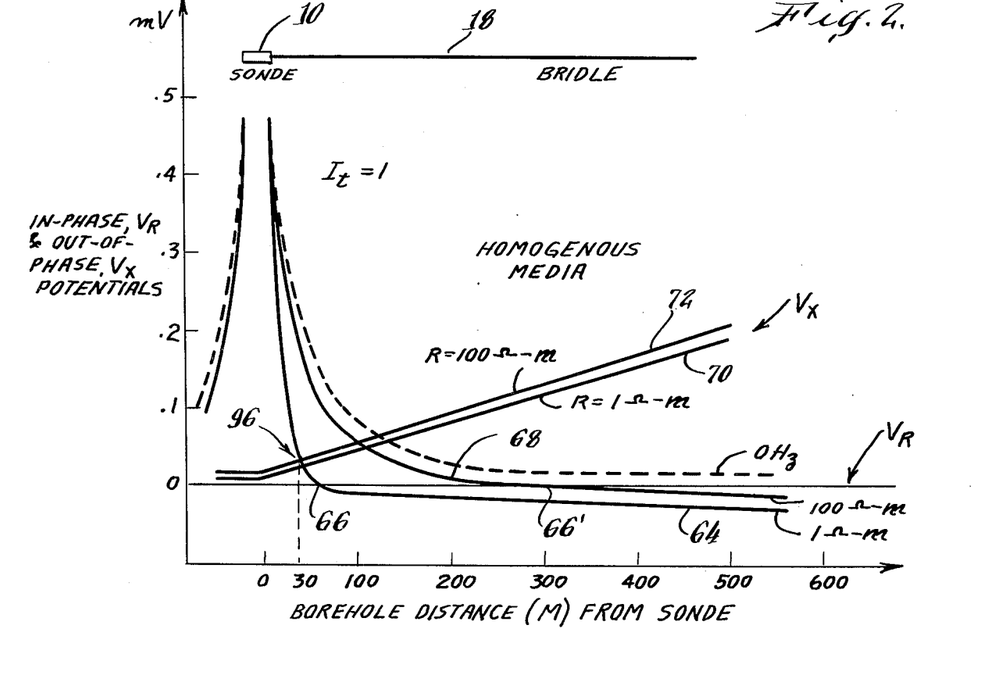
FIG. 2 is a plot of various potentials as a function of distance from the sonde.

Hence, when the potential distribution is examined, as measured for example relative to a zero potential point far below sonde 10, it behaves like DC over a radial distance less than the skin depth $\delta$ but quite differently at further distances from sonde 10 along the borehole 14. FIG. 2 illustrates curves for the variation of both in-phase and out-of-phase potentials (relative to the total return current $I_t$) caused by a sonde 10 along a very long bridle 18 and with the sonde 10 located in homogeneous formations for several different resistivities. The curve 64, for the in-phase potential $V_R$ is for a one $\Omega$-m resistivity and shows a DC-like divergence near sonde 10 followed by an increasing negative potential on the axis above the sonde. The zero crossing 66 of curve 64 takes place at a distance about 0.38 $\delta$ or at about 32 meters from the top of sonde 10. The increasing negative potential can be explained as a result of a secondary induction effect contributed by a formation current induced by the total current, $I_t$, flowing down towards sonde 10 along line 38 in cable 12. When the formation resistivity is 100 $\Omega$-m, curve 68 in FIG. 2 illustrates a similar potential distribution but with the cross-over point 66' now at about 320 meters from the sonde 10.

The out-of-phase potential, $V_x$, is shown with curves 70, 72 for respectively 1 and 100 $\Omega$-m homogeneous formations. The out-of-phase potential arises from an inductive effect and increases to relatively high values at large distances from sonde 10. The curves 70, 72 show a weak dependency of the out-of-phase potential upon the resistivity of the formation.

FIG. 2 thus shows that a negative in-phase potential exists which increases far above the sonde 10. The crossover point 66 of the in-phase potential, where it changes polarity, will vary depending upon the resistivity of the formation in which the sonde 10 is located.

When the effect of the exposed conductive sheath or armor 16 is considered, a significant perturbation of the in-phase potential may occur at end 22 of the conductive sheath 16. The conductive sheath 16, as a cable armor, usually has a thickness which is much smaller than the skin depth. For example, the cable may have a resistivity, $R_c$, of $4 \times 10^{-7}$ $\Omega$-m and a magnetic permeability of $10\mu_0$, thus providing a skin depth of about 17 millimeters at 35 Hz. This is about six times the usual armor thickness. Hence, the current returning in the cylinder to surface electrode B flows only partially inside the conductive sheath 16 as well as through the earth formation.

The flow of the return current into sheath 16 occurs over a distance, $L_c$, which from transmission line theory represents a characteristic length equal to $\sqrt{(R/R_c)}$ where R is the resistivity of the formation through which the conductive sheath passes and $R_c$ is the cable resistivity as noted above. The flow of current into conductive sheath 16 follows an exponential curve decreasing as a function of the distance, measured along the borehole from end 22. The effect of the conductive sheath 16 is thus to act as a short circuit which brings down towards end 22 negative, in-phase potentials, as suggested by equipotential lines 80 in FIG. 1. The distance from which such negative in-phase potentials may disturb the potential of a reference electrode N at 19 is a function of the characteristic length $L_c$.

In a situation involving a highly resistive bed 30 overlying a low resistive layer 32 and with the conductive sheath 16 terminating as shown in bed 30 but near the boundary 31, the characteristic length $L_c$ can be very great. For example, with a resistivity $R_s$ for the formation bed 30 of the order of 1000 $\Omega$-m, the characteristic length would be about 450 meters. At higher resistivity values the characteristic length $L_c$ may even exceed the bed thickness. In such case, however, the bed thickness becomes a maximum value for the characteristic length $L_c$.

As shown in FIG. 2, the in-phase potential, $V_R$, normally decreases very slowly with distance above sonde 10. Hence, potential measurements made relative to electrode N, which is located several tens of meters above electrode M on the sonde, do not normally induce errors beyond a fraction of a millivolt. However, the effect of the characteristic length $L_c$ is to bring potentials from far above the sonde 10 to the vicinity of the lowest exposed end 22 of the conductive sheath 16. Stated in another way, the potential $V_N$ of reference electrode N relative to an electrode which is far removed and thus at ground potential, is no longer negligible. As a result, substantial negative perturbations of the in-phase potential of the reference electrode N at 19 occur in the presence of highly resistive beds such as 30, thus leading to a higher than usual resistivity measurement, R.

The magnitude of the in-phase potential perturbation, $\Delta V_R$, can be determined from the linear resistance of the cylinder, $(\Omega\mu)/8$, the total current $I_t$ and the characteristic length $L_c$ in accordance with the relationship $$\Delta V_R = \frac{\omega \mu}{8} \times L_c \times I_t = \frac{\omega \mu}{8} \sqrt{\frac{R}{R_c}} \times I_t$$

Normally, the resistivity $R_a$ is given by the relationship $R_a = K(V_R/I_o)$, where $K$ is a factor related to the sonde 10 and may be of the order of one meter for a tool such as described in the aforementioned Scholberg patent. Hence, the error, $\Delta R_a$, of the resistivity measurement $R_a$ would then be $$\Delta R_a = K \times \frac{\Delta V_R}{I_o} \times \frac{\omega \mu}{8} \sqrt{\frac{R}{R_c}} .$$

When the reference electrode N is not connected to the conductive sheath 16, but is located as shown at 19' in FIG. 1 as an isolated electrode midway on bridle 18, the effects of the conductivity of the borehole 14 becomes significant. The borehole 14 may also appear as a short circuit with a characteristic length $L_h$ sufficient to cause, with the short circuit effect of sheath 16, an anomalously high resistivity measurement when the reference electrode N is in the high resistive formation bed 30 and the sonde 10 is in the low resistivity layer 32. In either case, the increase in $V_R$ due to $\Delta V_R$ cannot be measured directly.

I have discovered that the in-phase potential deviation, $\Delta V_R$, causing the high resistivity measurement below highly resistive beds, correlates with a phase sensitive signal such as the out-of-phase potential, $V_x$ or its deviation $\Delta V_x$, in a predetermined manner. The phase sensitive signal or the out-of-phase potential can be measured directly.

As a result of this discovery, a measurement is made of a phase sensitive signal between electrodes, one of which is closer to the lower end 22 of the conductive sheath 16 than the other. For example, one electrode may be an electrode such as N located between the conductive sheath end 22 and the other electrode $M_1$ on the sonde 10. The latter electrode, however, could also be a distant electrode away from the short circuit effect of conductive sheath 16 as long as a measurement of a phase sensitive signal reflects a measurement referenced to a potential in the region above the sonde around the bridle 18 or near end 22 of conductive sheath 16.

The phase sensitive signal useful for practicing the invention means a signal measurement which reflects the presence of an error in a resistivity measurement where the error is attributable to the short circuit effect of a conductive sheath such as 16 in FIG. 1. The phase sensitive signal bears some particular phase relationship with a current or potential with which a resistivity measurement is made. The term "phase sensitive signal" thus includes a signal representative of the phase angle determined with a current or potential used to derive resistivity and a signal indicative of a quadrature component of a potential measured with respect to a reference electrode N. The term "phase sensitive signal" also includes a magnitude, or its deviation, of such quadrature component as well as such other signals derived with such quadrature component to indicate the presence or actual value of a resistivity measurement error attributable to a short circuit effect of a conductive sheath such as 16.

Figure 3:
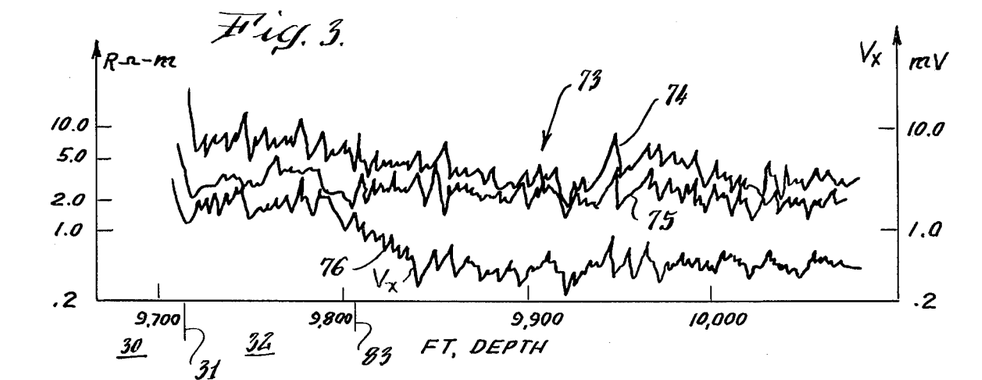
FIG. 3 is a portion of the resistivity well log as a function of well depth with an out-of-phase potential measurement recorded on the log in accordance with the invention.

With reference to FIG. 3, a portion of an illustrative well log 73 is shown for a borehole with a bed boundary 31 between a high resistivity bed 30 and low resistivity formation layer 32 being located at about 9715 feet. The log 73 shows, as a function of borehole depth, a formation resistivity measurement recording 74 made with a survey frequency at 35 Hz for a deep investigation as well as a formation resistivity measurement recording 75 made with a survey frequency at 280 Hz for a shallow investigation. The generation of a shallow resistivity measurement may be done in the same manner as described with reference to analyzer/driver 24. A recording 76 of a measurement of a phase sensitive signal such as the out-of-phase potential $V_x$ as it is produced on line 54 in driver/analyzer 24 is made in depth synchronization with the resistivity recordings 74, 75. The amplitude scale for resistivity and the out-of-phase potential are logarithmic.

The deep resistivity measurement 74 shows a gradual increase starting with an average level of 3 Ω-m at about a depth of 9875 feet to an average level of about 8 Ω-m at about 9780 feet. The resistivity measurement 74 goes off the scale above the bed boundary 31. The increase of the resistivity R below the bed boundary turns out to be in error and attributable to the previously described Groningen effect.

The out-of-phase potential $V_x$ exhibits with measurement 76 a relatively steady fluctuation between about 0.4 and 0.6 scale units which may be in millivolts up to a depth of about 9835 feet. The measurement 76 then rapidly increases to about 4 scale units millivolts until it also goes off-scale at the bed boundary 31. The change in the out-of-phase potential $V_x$ in the region below bed boundary 31 is dramatic, by a factor of 10. The recording 76 of the out-of-phase potential can be employed to identify the potential presence of an error in the resistivity such as 74.

The out-of-phase potential $V_x$ may thus also be employed to automatically produce a warning of a possible error in the resistivity measurement. This may be done, for example, with a network 77 as shown in FIG. 4.

Figure 4:
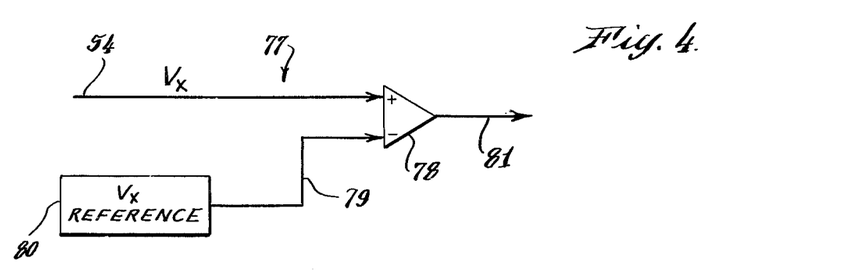
FIG. 4 is a schematic diagram of a network to derive an indication of an anomaly in electrical logging from a measurement of the out-of-phase potential.

In FIG. 4 the out-of-phase potential $V_x$ is applied to a comparator 78 for comparison with a threshold signal on line 79. The threshold signal is representative of a normal maximum excursion level for the out-of-phase potential. The threshold signal is derived from a suitable source 80 which, for example, produces a level of say one millivolt on line 79. Whenever the out-of-phase potential $V_x$ on line 54 exceeds its normal maximum level, comparator 78 produces an output on line 81 which can, for example, be recorded on log 73 in FIG. 3 with a suitable marker 83. The function performed with the embodiment as illustrated in FIG. 4 may be practiced with a digital signal processor.

Figure 5:
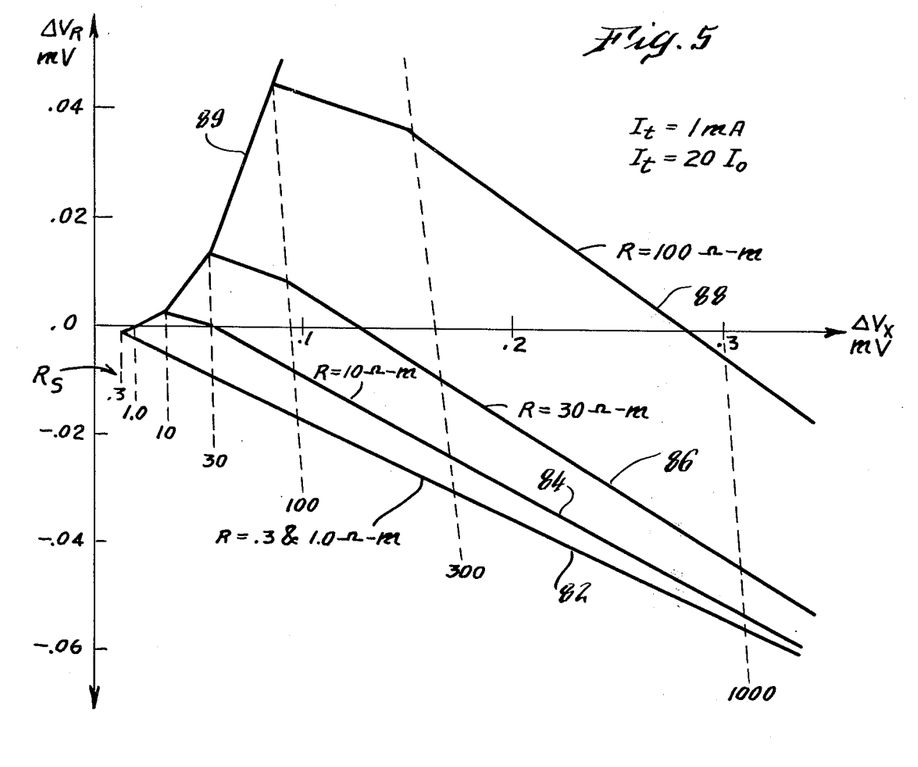
FIG. 5 is a cross-lot of the deviation of the in-phase potential as a function of the deviation in the out-of-phase potential for various formation conditions.

FIG. 5 illustrates several curves which are crossplots of the deviation, identified by the prefix Δ, of the in-phase potential, $\Delta V_R$, as a function of the out-of-phase potential deviation, $\Delta V_x$. This deviation $\Delta V_x$ of the out-of-phase potential, $V_x$, is determined relative to the value of an out-of-phase potential, $V_x^h$, for a homogeneous formation as measured at the same distance above the sonde 10 for which $V_x$ is measured, i.e. at 19 or 19' as shown in FIG. 1.

In a homogeneous formation the out-of-phase potential $V_x^h$ such as shown with curves 70, 72 in FIG. 2 varies linearly, as a function of distance above sonde 10, the square root of the formation resistivity R and the total return current, $I_t$. The out-of-phase potential $V_x^h$ at a particular distance above sonde 10 is selected as a normal value $V_x^h$. Preferably the out-of-phase potential at a location such as 19 for reference electrode N at the bottom end 22 of bridle 18 is used. For a sonde such as described in the Scolberg patent, where the reference electrode location 19 is thirty meters above a nine meter sonde, the out-of-phase potential for a homogeneous formation is determined by the relationship $$V_x^h = (0.776 + 0.739 \sqrt{R}) \times 10^{-2} \times I_t$$

corresponds to the value of $V_x$ at 96 in FIG. 2.

In FIG. 5 crossplots are shown according to which the in-phase potential deviation, $\Delta V_R$, varies as a function of the out-of-phase potential deviation, $\Delta V_x$, for resistivities, $R_s$ and R for formation bed 30 and layer 32 respectively when the top of sonde 10 is a predetermined spacing, S, below the interface 31. The crossplots in FIG. 5 do not vary significantly with different values for spacing S. Crossplot 82 is for a formation bed resistivity R of 0.3 and 1.0 $\Omega$-m. Plot 84 is for a resistivity R of 10 $\Omega$-m and has a similar slope as plot 82, but is displaced from the latter by a generally constant factor. Similarly, crossplots 86 and 88 appear as straight lines, at least within certain ranges for $\Delta V_x$ but are displaced from plot 82. Hence, when the resistivity R of layer 32 is constant, $\Delta V_R$ and $\Delta V_x$ are linearly related.

Figure 6:
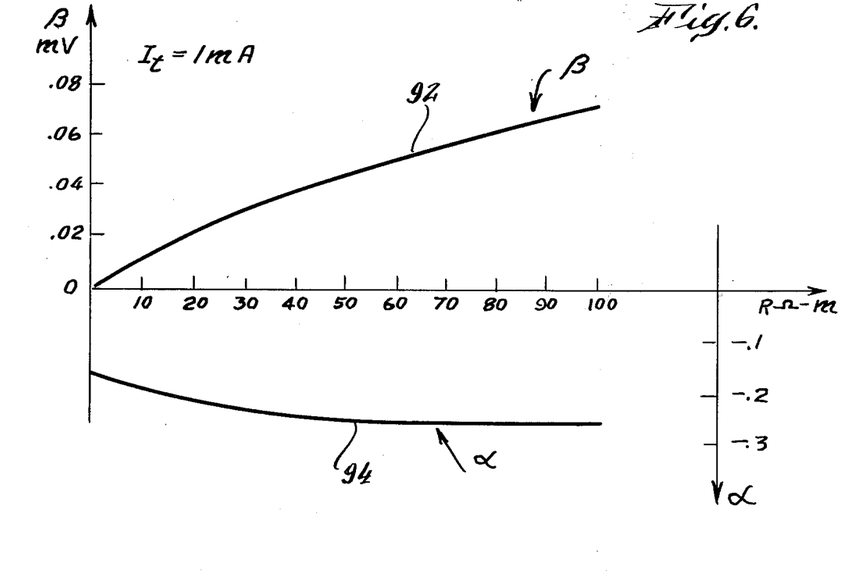
FIG. 6 is a plot of certain parameters used in determining the deviation of the in-phase potential.

The linear relationship can be described as $$\Delta V_R = \alpha \Delta V_x + \beta$$

where $\beta$ depends on the resistivity R and varies from zero for values of R equal to 1 $\Omega$-m and below, to values as illustrated with curve 90 in FIG. 6. Similarly $\alpha$ is equal to $-0.18$ for R equal to 1 $\Omega$-m and below and varies as a function of R as illustrated with curve 92 in FIG. 6. Crossplot 89 in FIG. 5 represents a homogeneous formation with resistivity values as can be determined from the intersection of plots 82, 84, 86, 88 with crossplot 89.

The extent to which a short circuited conductive sheath 16 may cause an error or anomaly in the measurement of resistivity decreases somewhat with higher values of resistivity. For example, when a tool such as described in the Scholberg patent is employed, the error of the resistivity measure $\Delta R$ can be expressed by the approximate relationship $$\Delta R = .01 \sqrt{R_s}.$$

Thus, if the resistivity of formation layer 32 is 10 $\Omega$-m, then the magnitude of the deviation $\Delta R$ is relatively small, about 1 $\Omega$-m or 10%. Hence, in many practical situations the cross-plot 82 for which $\beta = 0$ and $\alpha = -0.18$ is likely to be useful for determining the magnitude of the anomaly of the in-phase potential attributable to the Groningen effect.

With further reference to FIG. 1, another illustrative embodiment is shown for recording of an indication of the presence of error in resistivity as a result of a Groningen effect as well as a technique to measure and correct for the resistivity error. The measured out-of-phase potential signal $V_x$ on line 54 is applied to a comparator network 100. A signal representative of the normal out-of-phase potential, $V_x^h$, is produced on line 102 from a network 104. The output 106 of comparator 100 bears the out-of-phase potential deviation, $\Delta V_x$.

This signal may then be stored on recorder 108 directly as well as further processed.

The out-of-phase potential signal deviation, $\Delta V_x$, on line 106 is shown connected to a comparator 110 to produce on its output 112 a warning signal whenever the out-of-phase potential deviation exceeds a predetermined reference level on line 114. Such reference for $\Delta V_x$ may be produced with a network 116. The warning signal on line 112 may be recorded or used to activate an indicator 118.

The out-of-phase potential signal deviation, $\Delta V_x$, on line 106 is also applied to a function network 120. This network modifies the out-of-phase potential signal in accordance with curve 82 of FIG. 5 or the other curves as shown thereon, depending upon the measured value for the resistivity R. The output line 122 of function network 120 represents the deviation in the in-phase potential, $\Delta V_x$, attributable to the Groningen effect.

The magnitude of the deviation $\Delta R$ in the measured resistivity is obtained on line 123 by dividing the $\Delta V_R$ signal by the measured survey current $I_R$ in the network 124 and scaling it for the sonde factor K. The actual resistivity value R can then be obtained on line 126 by subtracting the value of $\Delta R$ from the measured resistivity value R in a comparator 128.

Figure 7:
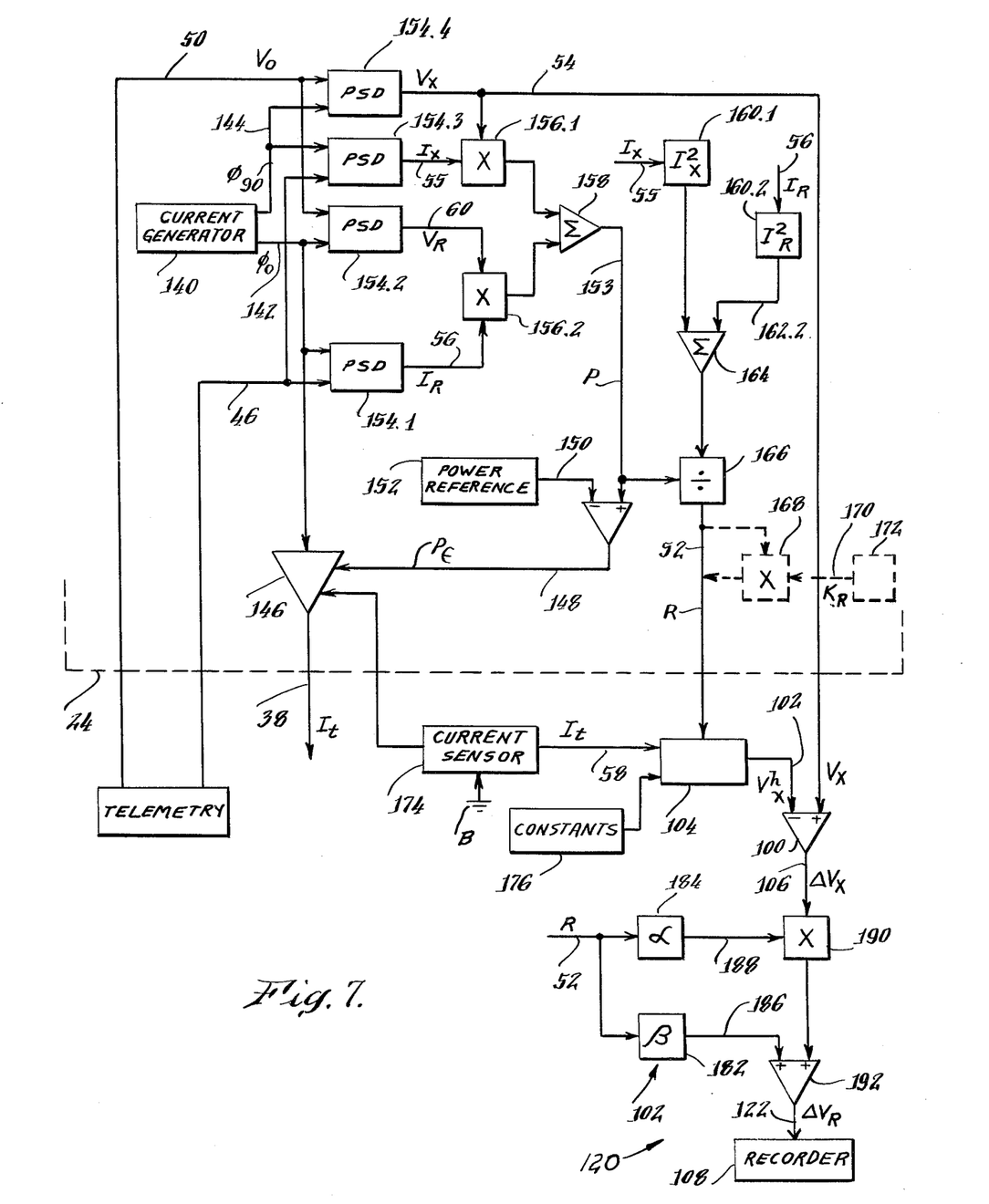
FIG. 7 is a more detailed schematic representation for the network depicted in FIG. 1.

In FIG. 7 a more detailed schematic view is shown for an embodiment to detect and measure the error in resistivity as a result of a highly resistive formation bed 30 overlying a layer 32. The driver/analyzer 24 is shown to include a current generator 140 which produces on outputs 142, 144, low frequency signals $\phi_o$, $\phi_{90}$ at 35 Hz with a 90° phase difference between them. The driver/analyzer 24 may also produce similar signals at a different frequency such as at 280 Hz for a shallow resistivity investigation of the earth formation. The zero phase signal on line 142 is applied to a drive amplifier 146 whose output, $I_t$, is applied to line 38 and thus along cable 12 to the control 20 in sonde 10. The return for amplifier 146 is from the return electrode B.

The output power delivered by amplifier 146 is maintained at a level which establishes a constant survey power to the $A_o$ survey electrode on sonde 10. This is obtained by way of a power error signal on line 148 derived from the comparison of a reference power signal on line 150 from a source 152 and a measurement, P, on a line 153 of the power actually applied by the survey electrode $A_o$ into the formation.

The power is measured by determining the real power according to the relationship $$P = V_R I_R + V_x I_x$$

The driver/analyzer 24 thus includes appropriate phase sensitive detectors such as 154 which are selectively connected to the current phase signals on lines 142, 144 and the survey current signal $I_o$ and survey potential signal $V_o$ on lines 46 and 50 to produce the needed phase signals.

The in-phase survey potential $V_R$ and in-phase current, $I_R$, are produced on the respective outputs 56, 60 of phase sensitive detectors 154.1 and 154.2. The out-of-phase potential, $V_x$, and out-of-phase current, $I_x$, are produced on the respective outputs 54 and 55 of phase sensitive detectors 154.4 and 154.3.

The out-of-phase potential $V_x$ on line 54 and out-of-phase survey current $I_x$ on line 55, are multiplied in multiplier network 156.1 and the in-phase potential $V_R$ on line 60 and in-phase survey current $I_R$ on line 56 are multiplied in a multiplier network 156.2. Then outputs of networks 156.1 and 156.2 are summed by adder network 158 to produce a signal representative of the power P supplied by survey electrode $A_o$ into the formation on line 153.

The resistivity R is determined in the driver/analyzer 24 in accordance with the relationship $$R = \frac{V_R I_R + V_x I_x}{I_R^2 + I_x^2} \times K_R$$

The numerator of this relationship is the value of the real power P as developed on line 153. The value for the denominator is generated by applying the out-of-phase survey current signal $I_x$ on line 55 to a multiplier network 160.1 which produces the square of its input on output 162.1. Similarly, the in-phase current signal, $I_R$ on line 56 is applied to network 160.2 to provide a square value on output 162.2. The outputs on line 162.1 and 162.2 are summed in adder 164 whose output is applied to divider 166. The latter generates a signal representative of the resistivity R on line 52.

The resistivity value R may in certain cases be adjusted to reflect a geometric factor as may be introduced as a result of the specific geometric spacings between the various electrodes A on sonde 10. Hence, the resistivity value R may be multiplied by a scale factor, $K_R$, which is a function of the particular sonde being used and is obtained after calibration of the sonde. Hence, if necessary, the resistivity value R may be adjusted for proper scaling in a multiplier network 168 by multiplication with the scale factor $K_R$ applied on a line 170 from a source 172.

The above description for the portion of the operation of driver/analyzer 24 at the outputs of the phase sensitive detectors 154 is made with analog devices. Preferably such computations are obtained with a signal processor using signals in digital form. An appropriate digital to analog converter is used and a computer with appropriate instructions provides the values for power error $P_e$ on line 148 and resistivity R on line 52. The driver/analyzer 24 is described herein for purposes of explanation and no invention therein is claimed herewith.

A current return sensor 174 is used to detect the total current flow, $I_t$, sent into the formation by sonde 10 and a signal representative thereof is produced on line 58. The total current signal $I_t$ on line 58 and the measured resistivity signal R on line 52 are combined in network 104 to provide, on line 102 a signal representative of a normal out-of-phase potential $V_x^h$, i.e. for a homogeneous formation. The constants needed to compute $V_x^h$ are generated by a source 176.

The deviation, $\Delta V_x$ on line 106, of the out-of-phase potential is applied to a modifier network 120. This performs the operation of $\Delta V_R = \alpha \Delta V_x + \beta$ with the values of $\alpha$ and $\beta$ determined with function former networks 182, 184 which respectively provide on outputs 186, 188 values, as a function of resistivity R, in accordance with curves 92 and 94 in FIG. 6. The value of $\Delta V_x$ on line 106 is multiplied by the value of $\alpha$ on line 188 in a multiplier network 190 and the value for $\beta$ on line 186 is added in network 192 to provide on line 122 a value for the in-phase potential deviation, $\Delta V_R$.

The in-phase potential deviation $\Delta V_R$ may be stored on a recorder 108, or used to determine the deviation in the resistivity R, or provide a warning indication when $\Delta V_R$ exceeds a normally expected range.

Figures 8, 9, 10:
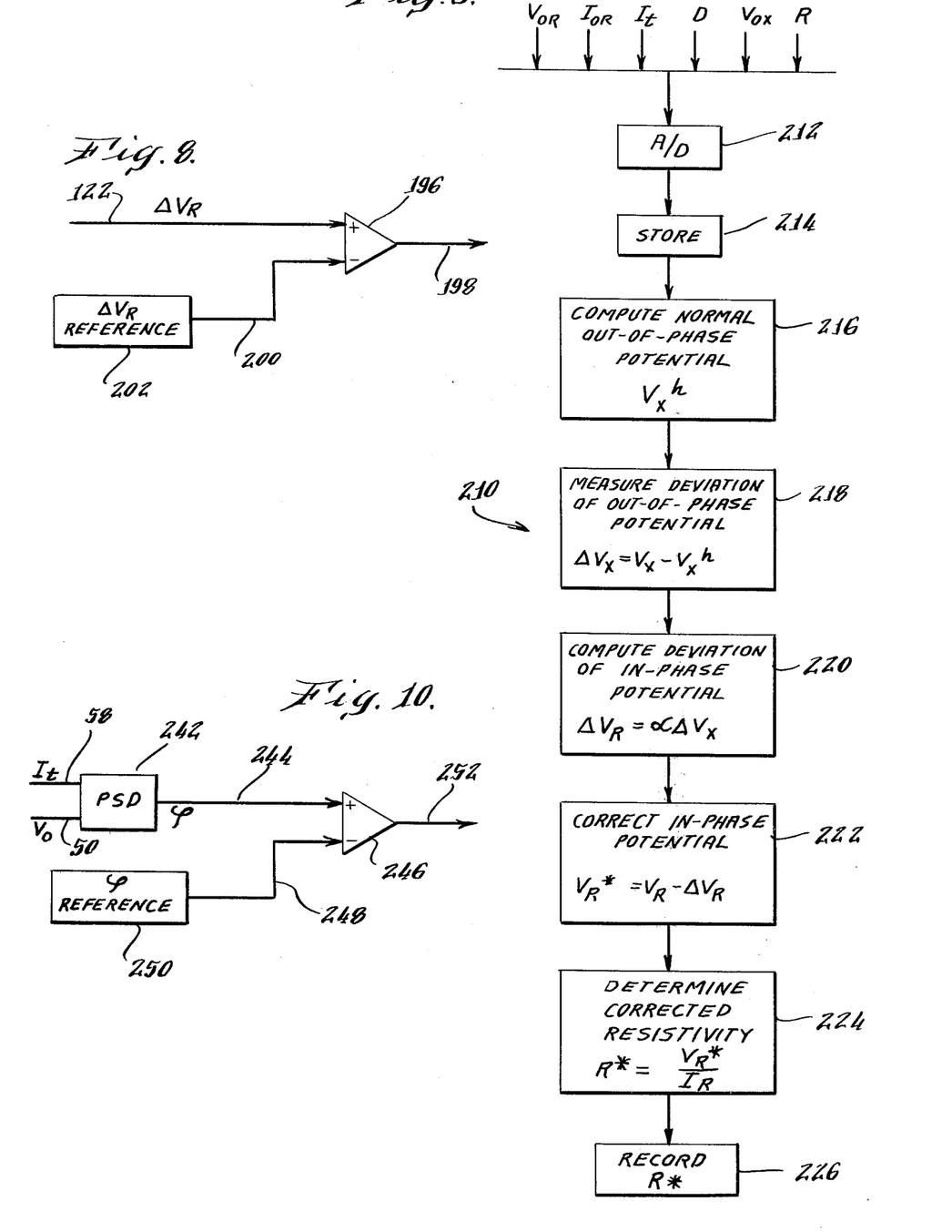
FIG. 8 is a schematic diagram of a network to derive an indication of the an anomaly in the electrical logging from a measurement of the deviation of an in-phase potential.
FIG. 9 is a flow chart for a signal processor to practice the technique in accordance with the invention.
FIG. 10 is a schematic diagram of a network to derive an indication of the presence of an anomaly in the electrical logging by measuring a phase angle.

Such warning may be generated, for example, as shown in FIG. 8 by applying $\Delta V_R$ on line 122 to a comparator 196 which generates an output warning on line 198 whenever $\Delta V_R$ exceeds a reference level on line 200 from a reference source 202.

FIG. 9 illustrates an embodiment for use in a signal processor 210 to obtain a corrected resistivity measurement. Input signals if generated by an analog form of driver/analyzer 24 are digitized by an A/D converter 212 and stored at 214. A value for the normal out-of-phase potential, $V_x^h$ is computed at 216 using the relationship as previously set forth. A measurement of the out-of-phase potential deviation, $\Delta V_x$, is generated at 218.

The deviation of the out-of-phase potential is modified at 220 by multiplying $\Delta V_x$ by the value of $\alpha$ such as applicable for a curve 82 in FIG. 5. The result is a measurement of the in-phase potential deviation, $\Delta V_R$, and a corrected in-phase potential signal $V_R^*$ is produced at 222 by subtracting the in-phase potential deviation. The corrected resistivity value $R^*$ is produced at 224 by dividing the corrected in-phase potential $V_R^*$ by the in-phase portion of the survey current, $I_R$. The corrected resistivity value may be stored or visually recorded at 226.

FIG. 10 illustrates another embodiment for detecting the presence of an error in a resistivity measurement. In a network 240 such as in FIG. 10, a phase sensitive signal in the form of a phase angle $\psi$ is measured with a phase sensitive detector 242. The phase angle $\psi$ is measured between the potential $V_o$ on line 50 and the total current $I_t$ on line 58, both of which are applied to network 242. The output on line 244 from network 242 is applied to a comparator 246 to which, on line 248, a reference signal representative of the normal maximum level for the phase angle $\psi$ is applied from a reference source 250. When the measured phase angle on line 244 exceeds the reference level on line 24, comparator 246 produces on line 252 an output signal indicative of the presence of an error in the resistivity measurement.

An alternative technique for determining a phase sensitive signal in the form of a phase angle may employ use of the out-of-phase and in-phase potentials, $V_x$ and $V_R$ in accordance with the well known phase angle relationship.

$$\psi = \text{Arctan } (V_x)/(V_R)$$

A suitable analog or digital computer may be used to derive the phase angle $\psi$ in accordance with this relationship.

The phase angle signal $\psi$ on line 244 may also be recorded with resistivity as a function of depth in a similar manner as the out-of-potential $V_x$ is recorded as shown and described with reference to FIG. 2. Normally the phase angle $\psi$, in the absence of a Groningent effect is likely to be as small as several degrees. However, when the effect is present and attributable to an armor conductive sheath, the phase angle may increase to about 70°. In the event the effect is present and attributable to a casing terminating in a highly resistive bed, the phase angle is likely to increase to the range from about 10° to about 40°. In reliance upon the phase angle $\psi$ to indicate the presence of an error in the resistivity measurement, it should be recognized that the phase angle magnitude is to some extent sensitive to resistivity changes. Since, the out-of-phase portion in the phase angle measurement is dominant, however, such sensitivity is a lesser Having thus explained several embodiments in accordance with the invention, its advantages can be appreciated. The recognition that a highly resistive formation bed can produce anomalous resistivity measurements as a result of the presence of a conductive sheath around the cable, even at frequencies as low as 35 Hz enables detection of a similar anomaly when the sheath is a casing. The skin depth in a steel casing, however, is about 3 mm at 35 Hz, thus usually about three times smaller than the casing thickness. As a result, all the current returning to the surface flows within the casing and in effect the return electrode B is at the bottom of the casing known as the casing shoe.

In such case the error in resistivity measurements below a bed boundary such as 31 in FIG. 1 can be substantially larger in comparison when the cable armor is the conductive sheath 16. Nonetheless, the anomaly in the resistivity measurement can be detected by monitoring the out-of-phase potential $V_x$ or its deviation from the homogeneous value for the out-of-phase potential.

The error in the resistivity measurements has been found to some extent dependent upon the location of the bottom end 22 of the sheath 16 relative to the boundary 31 between the highly resistive bed 30 overlying the low resistivity layer 32. When the sheath 16 is the cable armor, the latter's penetration to a relatively small extent into layer 32, about a half a meter, eliminates the resistivity error. In the case of a casing, however, its penetration up to about five meters may be required before the resistivity error is reduced to negligible levels.

The anomalies herein are described with particular reference to an electrical borehole investigation at 35 Hz; however, it should be understood that the technique of this invention may be practiced with borehole investigations at different frequencies.

What is claimed is:

1. In a method for electrically investigating earth formations traversed by a borehole where the earth formations may include a highly resistive formation bed overlying a formation layer characterized by a low resistivity relative to that of the formation bed and in which the investigation is made with a resistivity investigating sonde suspended from a cable surrounded by an exposed conductive sheath and with a reference electrode located between the sonde and the conductive sheath and with current electrodes located on the sonde to introduce alternating currents into the adjoining formation for a resistivity measurement thereof and return to a surface located return electrode, the improvement comprising the steps of measuring an electrical signal between an electrode on the sonde and the reference electrode;

deriving from the measured electric signal a phase sensitive signal which varies in response to a short circuit effect by said conductive sheath upon said reference electrode while remaining relatively insensitive to variations of the resistivity of the adjoining earth formation; and applying said phase sensitive signal to indicate the presence of an error in a resistivity measurement of the earth formation.

2. The method for electrically investigating earth formations in accordance with claim 1 wherein said phase sensitive signal represents an out-of-phase potential of an electrode on the sonde relative to the reference electrode and with the phase of said potential effectively being a quadrature component of said measured electrical signal.

3. The method for electrically investigating earth formations in accordance with claim 1 wherein said phase sensitive signal effectively represents a phase angle between the measured electrical signal and a current introduced into the adjoining earth formation.

4. The method for electrically investigating earth formations in accordance with claim 2 wherein said phase sensitive signal is the phase angle measured with said out-of-phase potential and an in-phase potential between said electrode on the sonde and the reference electrode.

5. The method for electrically investigating earth formations in accordance with claim 1 wherein said step for applying the phase sensitive signal further includes the step of deriving from said phase sensitive signal an indication of the magnitude of an error in the resistivity measurement.

6. The method for electrically investigating earth formations in accordance with claim 1, 2, or 3 wherein said applying step includes the step of recording said phase sensitive signal with the measured resistivity as a function of borehole depth.

7. The method for electrically investigating earth formations in accordance with claim 6 wherein said phase sensitive signal is measured at a low frequency.

8. The method for electrically investigating earth formations in accordance with claim 1 wherein said applying step includes the step of recording as a function of borehole depth said phase sensitive signal with a pair of resistivity measurements which respectively represent shallow and deep resistivity measurements.

9. The method for electrically investigating earth formations in accordance with claim 8 wherein said phase sensitive signal is measured at a frequency corresponding to that used to obtain a deep resistivity measurement.

10. The method for electrically investigating earth formations in accordance with claim 1 wherein said applying step further includes the step of generating an indication of the presence of an error in the resistivity measurement when the phase sensitive signal exceeds a normal level.

11. In a method for electrically investigating earth formations traversed by a borehole where the earth formations may include a highly resistive formation bed overlying a formation layer characterized by a low resistivity relative to that of the formation bed and in which the investigation is made with a resistivity investigating sonde suspended from a cable surrounded by an exposed conductive sheath and with a reference electrode located between the sonde and the conductive sheath and with current electrodes located on the sonde to introduce alternating currents into the adjoining formation for a resistivity measurement thereof and return to a surface located return electrode, the improvement comprising the steps of measuring an out-of-phase potential of an electrode on the sonde relative to the reference electrode; and applying said measured out-of-phase potential to indicate the presence of an error in a resistivity measurement of the formation.

12. The method for electrically investigating earth formations in accordance with claim 11 wherein said applying step includes the step of
recording said out-of-phase potential with the measured resistivity as a function of borehole depth.

13. The method for electrically investigating earth formations in accordance with claim 12 wherein said out-of-phase potential is measured at a low frequency.

14. The method for electrically investigating earth formations in accordance with claim 11 wherein said applying step includes the step of
recording as a function of borehole depth said out-of-phase potential with a pair of resistivity measurements which respectively represent shallow and deep resistivity measurements.

15. The method for electrically investigating earth formations in accordance with claim 14 wherein said out-of-phase potential is measured at a frequency corresponding to that used to obtain a deep resistivity measurement.

16. The method for electrically investigating earth formations in accordance with claim 11 wherein said applying step further includes the step of
generating an indication of the presence of an error in the resistivity measurement when the out-of-phase potential exceeds a normal level.

17. The method for electrically investigating earth formations in accordance with claim 11 wherein said step for applying the out-of-phase potential further includes the step of
deriving from said measured out-of-phase potential an indication of the magnitude of an error in the resistivity measurement.

18. In a method for electrically investigating earth formations traversed by a borehole where the earth formations may include a highly resistive formation bed overlying a formation layer characterized by a low resistivity relative to that of the formation bed and in which the investigation is made with a resistivity investigating sonde suspended from a cable surrounded by an exposed conductive sheath and with a reference electrode located between the sonde and the sheath and with current electrodes located on the sonde to introduce alternating currents into the adjoining formation for return to a surface located return electrode, the improvement comprising the steps of
measuring the deviation of an out-of-phase potential of an electrode on the sonde relative to the reference electrode wherein the deviation is attributable to a short-circuit effect of the sheath when its exposed segment is located within the highly resistive formation bed while the tool is in the low resistive formation layer; and
applying said out-of-phase potential deviation to indicate the presence of an error in a resistivity measurement.

19. The method for electrically investigating earth formations in accordance with claim 18 wherein the applying step further includes the step of
determining from said measured out-of-phase potential deviation an indication of the magnitude of an error in the measured resistivity of the low resistive formation layer.

20. The method for electrically investigating earth formations in accordance with claim 18 wherein said out-of-phase potential deviation measuring step further includes the steps of generating a signal representative of the normal value of the out-of-phase potential; and
comparing the normal out-of-phase potential signal with the measured out-of-phase potential to provide said out-of-phase potential deviation.

21. The method for electrically investigating an earth formation in accordance with claim 20 wherein the step of measuring the deviation of the out-of-phase potential further comprises the steps of
modifying the measured deviation of the out-of-phase potential in accordance with a predetermined relationship to obtain a measurement of the deviation of the in-phase potential of said sonde electrode relative to the reference electrode; and
applying the in-phase potential deviation to indicate the presence of an error in the resistivity measurement.

22. The method for electrically investigating earth formations in accordance with claim 21 wherein the step for applying the in-phase potential further includes the steps of
measuring the current introduced into the formation layer by a survey electrode; and
dividing the measured deviation of the in-phase potential by the measured current to determine the magnitude of the deviation in the resistivity measurement caused by the short-circuit effect of the conductive sheath.

23. The method for electrically investigating earth formations in accordance with claim 20 wherein the step of generating a signal representative of the normal value of the out-of-phase potential comprises generating a signal representative of the out-of-phase potential for a homogeneous earth formation at a location corresponding to the location of said reference electrode.

24. The method for electrically investigating earth formations in accordance with claim 20 wherein the step of generating a signal representative of the normal value of the out-of-phase potential comprises generating a signal representative of a normal maximum excursion level of the out-of-phase potential.

25. A method for electrically investigating earth formations traversed by a borehole wherein a resistivity investigating sonde is suspended in the borehole from an armored cable with a reference electrode located above the sonde with a current electrode on the sonde comprising the steps of
measuring the out-of-phase potential of an electrode on the sonde relative to the reference electrode and producing a signal representative thereof; and
modifying the measured out-of-phase potential signal in a predetermined manner to obtain an indication of an error in the measurement of the resistivity of the earth formation investigated by the sonde.

26. The method for electrically investigating earth formations in accordance with claim 25 wherein the step of modifying the out-of-phase potential further includes the steps of
generating a signal representative of a normal out-of-phase potential for a homogeneous earth formation characterized with a resistivity of the earth formation in which the sonde is located at the time the out-of-phase potential is measured; and
comparing the measured out-of-phase potential signal with the generated normal out-of-phase potential signal to produce a signal representative of the difference therebetween as an indication of the deviation in the measurement of the resistivity.

27. The method for electrically investigating earth formations in accordance with claim 26 wherein the modifying step further includes the steps of multiplying the difference signal by a predetermined factor to obtain a signal representative of the deviation of the in-phase potential of the electrode on the sonde relative to the reference electrode;

dividing the signal representative of the deviation of the in-phase potential by a signal representative of a survey current used to measure resistivity for the formation to determine the magnitude of the deviation in the measured resistivity.

28. The method for electrically investigating earth formations in accordance with claim 25 wherein said modifying step further includes deriving from the measured out-of-phase potential a signal representative of a deviation of the in-phase potential between the electrode on the sonde and the reference electrode, wherein said deviation is attributable to a short-circuit effect of the armor of the cable from which the sonde is suspended with a highly resistive formation bed in which the armor is located.

29. The method for electrically investigating earth formations in accordance with claim 28 wherein said deriving step further includes measuring a survey current introduced by said current electrode;

determining the portion of said survey current which is in-phase with said in-phase potential signal; and combining the signal representative of the deviation of the in-phase potential with the in-phase portion of the measured formation current to obtain a measurement of the resistivity deviation attributable to said short-circuit effect of the cable armor.

30. An apparatus for the electrical investigation of an earth formation traversed by a borehole in which a resistivity investigating sonde is suspended from a cable surrounded by a conductive sheath with a reference electrode located between the sonde and the sheath with electrodes on the sonde including a current electrode located to introduce an alternating current into the earth formation comprising:

means for generating a phase sensitive signal representative of an out-of-phase potential of an electrode on the sonde with respect to the reference electrode with the phase of said potential effectively being a quadrature component of the potential between the electrode on the sonde and the reference electrode;

means responsive to the phase sensitive signal for generating a signal indicative of the presence of an error in the measurement of the resistivity of the earth formation investigated by the sonde.

31. The apparatus for electrically investigating an earth formation in accordance with claim 30 wherein the means for generating a signal indicative of the presence of a resistivity error further includes means for producing a signal representative of a normal value for the out-of-phase potential; and means for comparing the measured out-of-phase potential with said normal value to obtain the difference therebetween as an indication of the presence of an error in the resistivity measurement.

32. The apparatus for electrically investigating an earth formation in accordance with claim 31 wherein said means for producing a normal value comprises means for producing a normal value signal representative of the out-of-phase potential for a homogeneous earth formation at the location of said reference electrode.

33. The apparatus for electrically investigating an earth formation in accordance with claim 32 wherein said means for producing a normal value comprises means for producing a normal value signal representative of a normal maximum excursion level of the out-of-phase potential.

34. In a resistivity measuring apparatus which electrically investigates earth formation traversed by a borehole where the earth formation may include a highly resistive formation bed overlying a low resistive formation layer and where the apparatus includes a resistivity investigating sonde suspended from a cable surrounded by a conductive sheath with a reference electrode located between the sonde and the conductive sheath and with a current electrode located on the sonde to introduce an alternating current into the adjoining formation for return to a surface located return electrode, the improvement comprising means for measuring a deviation of the out-of-phase potential of an electrode on the sonde relative to the reference electrode with said deviation being with respect to an out-of-phase potential for a homogeneous earth formation having a resistivity generally comparable to the resistivity of said low resistive formation layer and provide a signal indicative thereof and representative of the presence of an error in a measured resistivity of the formation layer with said error being attributable to a short-circuit effect of the conductive sheath when it is located within the highly resistive formation bed while the sonde is in a low resistive formation layer.

35. The improved resistivity measuring apparatus as set forth in claim 34 and further comprising means responsive to the out-of-phase potential deviation for producing a signal representative of the magnitude of the error in the measured resistivity of the formation layer attributable to said short circuit effect.

36. The improved resistivity measuring apparatus as set forth in claim 35 wherein said means for producing a signal representative of the magnitude of the resistivity error further includes means responsive to the out-of-phase potential deviation for deriving a signal representative of an in-phase potential deviation attributable to said short circuit effect; and means responsive to said in-phase potential deviation for producing said signal representative of the magnitude of the error in the resistivity.

37. The improved resistivity measuring apparatus as set forth in claim 34 and further including function forming means responsive to said out-of-phase potential deviation for producing an in-phase potential deviation signal attributable to said short circuit effect as an indication of the presence of an error in the measured resistivity.

38. The improved resistivity measuring apparatus as set forth in claim 37 wherein said function forming means includes means for modifying the out-of-phase potential deviation to derive the in-phase potential deviation in accordance with the relationship $$\Delta V_r = \Delta V_x + \beta,$$

where $\Delta V_r$ is the in-phase potential deviation, $\Delta V_x$ is the out-of-phase potential deviation, $\alpha$ is a slope value which varies between about $-0.18$ to about $-0.25$ as a function of formation resistivity, with the value of about $-0.18$ being used with a resistivity from about 0.3 to about 1.0 $\Omega$-m and the value of $-0.25$ being used with a resistivity of about 100 $\Omega$-m; and $\beta$ is an intercept value, which, for millivolt scale units for $\Delta V_r$ and $\Delta V_x$ varies approximately linearly as a function of resistivity, with $\beta$ equal to about zero millivolts at a resistivity in the range of about 0.3 to about 1.0 $\Omega$-m and $\beta$ equal to about 0.08 millivolts for a resistivity of about 100 $\Omega$-m.

39. In a method for electrically investigating earth formations traversed by a borehole where the earth formations include a highly resistive formation bed overlying a formation layer characterized by a low resistivity relative to that of the formation bed and in which the investigation is made with a resistivity investigating sonde suspended from a cable surrounded by an exposed conductive sheath and with a reference electrode located above the sonde and the sheath and with current electrodes located on the sonde to introduce alternating currents into the adjoining formation for return to a surface located return electrode, comprising the steps of measuring the deviation of an out-of-phase potential of an electrode on the sonde relative to the reference electrode wherein the deviation is measured with respect to a normal value of the out-of-phase potential;

modifying the measured deviation of the out-of-phase potential according to a predetermined relationship to produce a measurement of the deviation of the in-phase potential of said sonde electrode relative to the reference electrode;

measuring the value of a current from an electrode on the sonde; and combining the in-phase potential deviation with the measured current from the electrode to determine the magnitude of a resistivity error attributable to a short circuit effect of the conductive sheath when it is located in said high resistive formation bed.

40. The method as set forth in claim 39 wherein the step for modifying the out-of-phase potential deviation generates the in-phase potential deviation in accordance with the relationship $$\Delta V_r = \Delta V_x + \beta,$$

where $\Delta V_r$ is the in-phase potential deviation, $\Delta V_x$ is the out-of-phase potential deviation, p1 $\alpha$ is a slope value which varies between about $-0.18$ to about $-0.25$ as a function of formation resistivity, with the value of about $-0.18$ being used with a resistivity from about 0.3 to about 1.0 $\Omega$-m and the value $-0.25$ being used with a resistivity of about 100 $\Omega$-m; and $\beta$ is an intercept value, which, for millivolt scale units for $\Delta V_r$ and $\Delta V_x$ varies approximately linearly as a function of resistivity, with $\beta$ equal to about zero millivolts at a resistivity in the range of about 0.3 to 1.0 $\Omega$-m and $\beta$ equal to about 0.08 millivolts for a resistivity of about 100 $\Omega$-m.

41. An apparatus for the electrical investigation of an earth formation traversed by a borehole in which a resistivity investigating sonde is suspended from a cable surrounded by a conductive sheath with a reference electrode located between the sonde and the sheath and with a current electrode located on the sonde to introduce an alternating current into the earth formation comprising means for generating a phase sensitive signal with respect to the reference electrode;

means responsive to the phase sensitive signal for generating a signal indicative of the presence of an error in the measurement of the resistivity of the earth formation investigated by the sonde.

42. The apparatus according to claim 41 wherein said phase sensitive signal generating means includes means for producing a signal representative of the out-of-phase potential between an electrode on the sonde and said reference electrode.

43. The apparatus according to claim 42 wherein said phase sensitive signal generating means includes means for producing a signal representative of a phase angle measured with respect to the out-of-phase potential of said reference electrode.

* * * * *